Patented May 18, 1943

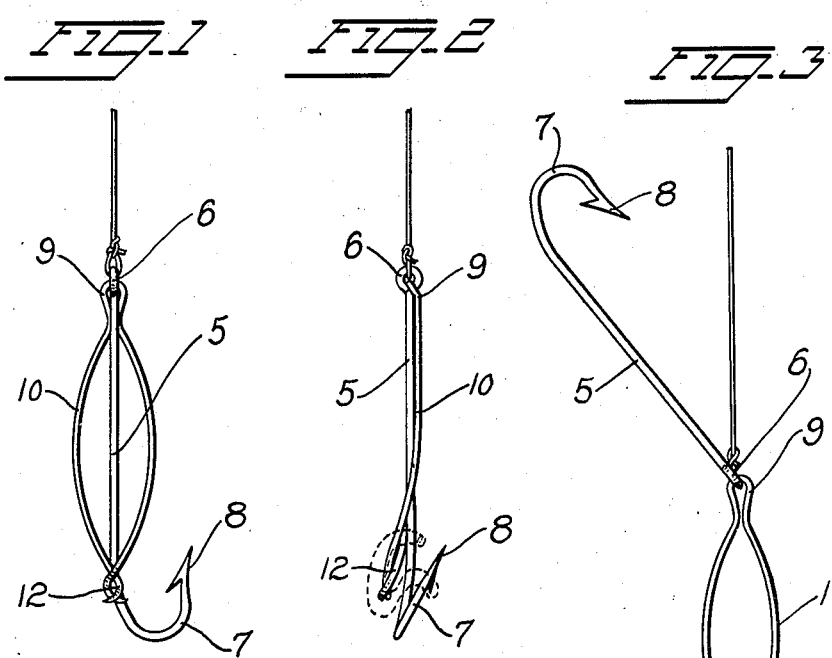

2,319,246

UNITED STATES PATENT OFFICE 2,319,246

BAIT-HOLDING ATTACHMENT FOR FISH-HOOKS

Trevellic O. Martin, Jackson, Tenn., assignor of sixty-five per cent to Elmer S. Miller, Jackson, Tenn.

Application May 19, 1941, Serial No. 394,204

6 Claims. (Cl. 43—40)

This invention relates to fish hooks and more particularly to means for supporting bait thereon.

The object of the invention is to provide a fish hook having a bait holder associated therewith and disposed in juxtaposition with respect to the barb of the hook so as to avoid the necessity of impaling a worm or other bait thereon with resultant soiling of the hands or clothing which often occurs when baiting a hook in the usual manner.

A further object of the invention is to provide a fish hook having a bait holder pivotally mounted on the shank thereof and comprising coacting spring-pressed jaws adapted to grip and support the bait adjacent the barb of said hook, said holder being free to swing laterally with respect to the hook so as to prevent the barb from piercing or lacerating the fingers when applying the bait.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a side elevation of a fish hook provided with a bait holder constructed in accordance with the present invention, Figure 2 is a front elevation showing in dotted lines a worm or other type of bait supported by the holder, Figure 3 is a side elevation showing the holder swung laterally with respect to the shank of the hook to facilitate gripping the bait, Figure 4 is a perspective view of the bait holder detached and showing a modified form of impaling spur, and Figure 5 is a side elevation illustrating a further modification.

The improved bait holder forming the subject-matter of the present invention may be applied to any style or type of fish hook, and by way of illustration is shown in connection with a fish hook of standard construction, in which 5 indicates the shank, 6 the line attaching eye and 7 the hook proper terminating in a barb 8.

The device is preferably formed from a single length of resilient material, such as spring wire, having its intermediate portion bent to form an elongated attaching loop 9 which fits within the eye 6 of the hook and serves to pivotally support the holder on the shank of said hook. After the loop 9 is formed the wire or other material is bent to form laterally bowed resilient arms 10, the free ends of which are crossed at 11 and terminate in coacting gripping jaws 12 having terminal points 13 adapted to pierce a worm or other bait, indicated at 14, so as to prevent accidental displacement thereof when fishing.

When baiting a hook, the holder is swung laterally to the position shown in Figure 3 of the drawing, and in which position the barb of the hook will be out of the way so as to prevent piercing or otherwise lacerating the fingers. The arms 10 are then pressed inwardly between the thumb and forefinger which expands the gripping jaws 12 so that said jaws which fit over and around the bait and the points 13 pierce the bait when the lateral pressure on the arms 10 is relieved. The holder with the bait in position thereon is then swung downwardly on its pivotal axis to the position shown in Figure 1 of the drawing, and in which position the bait will be supported near the bill of the hook so that, when a fish attempts to take the bait, it will be impaled upon the barb of the hook in the usual manner. By reference to Figures 1 and 2 of the drawing, it will be noted that when the bait holder is in lowered or operative position, the shank of the hook extends between the resilient arms 10 with the attaching loop 9 on one side of said shank and the jaws 12 on the other side thereof so as to hold the bait adjacent the barb of the hook at all times and prevent the holder, with the bait thereon, from swinging away from the hook when making a casting.

It is a well known fact that some fishermen, especially women, strenuously object to impaling a worm or other live bait on the bill of a hook due to the fact that their fingers or clothing often become soiled and, furthermore, because they believe that such impalment of a live bait is inhuman. The present invention avoids these objectionable features inasmuch as it it not necessary to manually handle the bait as said bait can be applied to the holder by merely positioning the holder over the bait and compressing the spring arms 10 in the manner previously described. Inasmuch as the holder is pivotally connected with the hook, said holder is always in position to receive the bait so that liability of the holder becoming lost or misplaced in a fishing kit or box is reduced to a minimum. Furthermore, when the bait is supported directly on the barb of a hook, a fish will often nibble at the bait without being caught, but when the bait is supported adjacent the barb of the hook and not directly thereon, a fish attempting to take said bait will come in contact with the barb and be either snagged or impaled thereby.

In Figure 4 of the drawing, there is illustrated a modified form of the invention in which the clamping jaw of one of the spring arms 10' of the bait holder is bifurcated at 15 to receive the terminal of the other clamping jaw when said arms are in normal position, as indicated by dotted lines.

In Figure 5 of the drawing, there is illustrated a further modification of the invention, in which the bait holder is pivotally mounted for sliding movement on the shank of the hook. In this form of the device, the holder 16 is substantially heart shaped in contour and at the intersection of the lobes 17 of the holder the wire or other material of which the holder is constructed is bent inwardly to form an eye 18 adapted to receive the lower portion of the shank of the hook 19. In using this form of the device, the holder may be slid longitudinally of the shank of the hook to any desired position thereon and then swung laterally to either side thereof, when by pressing inwardly on the sides of the holder, the clamping jaws thereof will grip the bait. After the baiting operation, the holder is slid longitudinally of the shank to a position in engagement with the hook proper and in which position the bait will be suspended immediately below the hook and in position to be readily attracted by a passing fish.

While the holder is especially designed for supporting live bait, such as worms, beetles, bugs and the like, it will, of course, be understood that said holder may be used with equally good results for supporting any type of artificial bait and that the bait instead of being pierced by the jaws may be gripped between the same.

It will, furthermore, be understood that the holders may be in different sizes and shapes and attached to any style or type of fish hook without departing from the spirit of the invention.

Having thus described the invention, what is claimed as new is:

1. A device of the class described comprising a hook including a barb and a shank terminating in a line-attaching eye, and a bait holder pivotally mounted in said eye and including spring-pressed arms between which the shank extends, the upper portions of said arms being disposed on one side of the shank and the lower portions on the other side and terminating in gripping jaws adapted to impale the bait and support said bait adjacent the barb of the hook.

2. A device of the class described comprising a hook having a barb and a shank terminating in a line-attaching eye, and a bait holder pivotally mounted in said eye and including laterally bowed resilient arms terminating in coacting gripping jaws adapted to receive and support bait.

3. A device of the class described comprising a hook having a barb and shank, and a holder pivotally mounted on the shank and provided with laterally bowed spring-pressed arms terminating in gripping jaws for engagement with bait, one of said gripping jaws being provided with a piercing point and the other jaw being bifurcated to receive said piercing point.

4. A device of the class described comprising a hook including a barb and a shank having a line attaching eye, and a bait holder pivotally mounted in said eye and having its pivoted end normally disposed on one side of the shank and its free end on the other side of said shank and provided with means for supporting bait in juxtaposition to the barb.

5. A device of the class described comprising a hook including a barb and a shank terminating in a line attaching eye, and a bait holder pivotally mounted in the eye and provided with spaced arms between which the shank extends for supporting bait adjacent the barb of the hook.

6. A device of the class described comprising a hook having a barb and a shank provided with an attaching eye, and a holder pivotally mounted in said eye and provided with terminal gripping jaws adapted to engage bait, said holder being movable laterally to one side of the hook to permit the holder to engage the bait.

TREVELLIC O. MARTIN.